(12) United States Patent
Kanie

(10) Patent No.: US 7,008,160 B2
(45) Date of Patent: Mar. 7, 2006

(54) DEVICE FOR MOUNTING A COMPONENT SUCH AS A PIPE ON A STUD

(75) Inventor: Hideki Kanie, Nissin (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/624,646

(22) Filed: Jul. 23, 2003

(65) Prior Publication Data

US 2004/0141828 A1     Jul. 22, 2004

(30) Foreign Application Priority Data

Aug. 1, 2002    (JP)    ............................. 2002-224620

(51) Int. Cl.
F16B 37/16    (2006.01)
(52) U.S. Cl. ...................... 411/433; 411/437
(58) Field of Classification Search ................ 411/433, 411/437, 525, 526, 527
See application file for complete search history.

(56) References Cited

U.S. PATENT DOCUMENTS

| | | | | |
|---|---|---|---|---|
| 1,069,451 A | * | 8/1913 | Marston | 411/437 |
| 4,828,444 A | * | 5/1989 | Oshida | 411/437 |
| 4,934,889 A | * | 6/1990 | Kurosaki | 411/433 |
| 4,999,019 A | * | 3/1991 | Kraus | 411/512 |
| 5,423,647 A | * | 6/1995 | Suzuki | 411/433 |
| 5,598,994 A | * | 2/1997 | Olewinski et al. | 248/73 |
| 5,816,762 A | * | 10/1998 | Miura et al. | 411/433 |
| 6,070,836 A | | 6/2000 | Battie et al. | 248/68.1 |
| 6,155,762 A | * | 12/2000 | Courtin | 411/512 |
| 6,185,792 B1 | | 2/2001 | Nelson et al. | 24/16 |
| 6,240,602 B1 | | 6/2001 | Geiger | 24/16 |

FOREIGN PATENT DOCUMENTS

| | | |
|---|---|---|
| EP | 0 751 597 | 1/1997 |
| EP | 0 759 523 | 2/1997 |
| JP | 09-159061 | 6/1997 |

* cited by examiner

Primary Examiner—Flemming Saether
(74) Attorney, Agent, or Firm—Miles & Stockbridge PC

(57) ABSTRACT

A device for mounting a component, such as a pipe, on a threaded stud comprises a main body section with a bore for inserting a stud and a component mounting section. A plurality of pawls extend from the inner wall of the bore in a direction perpendicular to the axis of the bore. Each of the pawls has a flexible thin section connected to the inner wall and a thick section extending from the thin section. The pawls can be bent in opposite directions at the thin sections. A pair of engaging sections for engaging threads of the stud are formed at the end of each thick section. A pair of grooves for engaging threads are formed adjacent to the engaging sections.

5 Claims, 3 Drawing Sheets

US 7,008,160 B2

DEVICE FOR MOUNTING A COMPONENT SUCH AS A PIPE ON A STUD

CROSS-REFERENCE TO RELATED APPLICATION

This application claims the benefit of Japanese Patent Application No. 2002-224620 filed Aug. 1, 2002, incorporated herein by reference.

BACKGROUND OF THE INVENTION

This invention relates to a device for mounting components, such as pipes, on a stud.

Prior devices for attaching a component to a threaded stud, welded to the body of an automobile, for example, have a bore into which the stud is inserted to engage pawls that fasten the device to the stud. In one such device, the orientation of the pawls in the bore is fixed, which restricts insertion of the stud into the bore to a single direction.

Japanese Unexamined Patent Application Publication No. 9-159061 discloses a device for attaching a component to a stud, in which the stud can be inserted into a bore from either end. Flexible fingers having thread-engaging protrusions bend from hinge sections when a stud is inserted into the bore. However, the fingers are bent nearly 90° from the hinge sections, and as a result a large insertion force is required to insert the stud. Also, because the retention force is limited by the thin sections, the attachment of the device to the stud is weak.

BRIEF DESCRIPTION OF THE INVENTION

An object of the present invention is to provide a device for mounting a component on a stud, in which the stud can be inserted into a bore of the device from either end, with a small insertion force, and in which the attachment of the device to the stud is strong and reliable.

Briefly stated, a device according to the present invention employs pawls that have a thick section extending from a thin section forming a hinge that connects the pawl to the wall of the bore. The thick section of the pawl has a groove, and the pawls are disposed at staggered positions along the bore so that the grooves engage crests of threads of the stud from opposite sides of the bore.

The invention will be further described in conjunction with the accompanying drawings, which illustrate a preferred (best mode) embodiment of the invention, and wherein:

FIG. 1c is a plan view of a device of the invention as seen from a direction opposite to that of FIG. 1a;

FIG. 1d is a fragmentary sectional view taken along line A—A in FIG. 1a;

DETAILED DESCRIPTION OF THE INVENTION

Figure 1A:
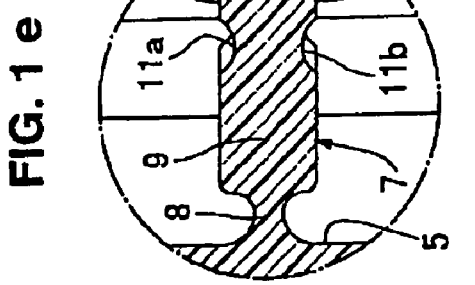
FIG. 1a is a plan view of a device according to the invention.
Figure 1B:
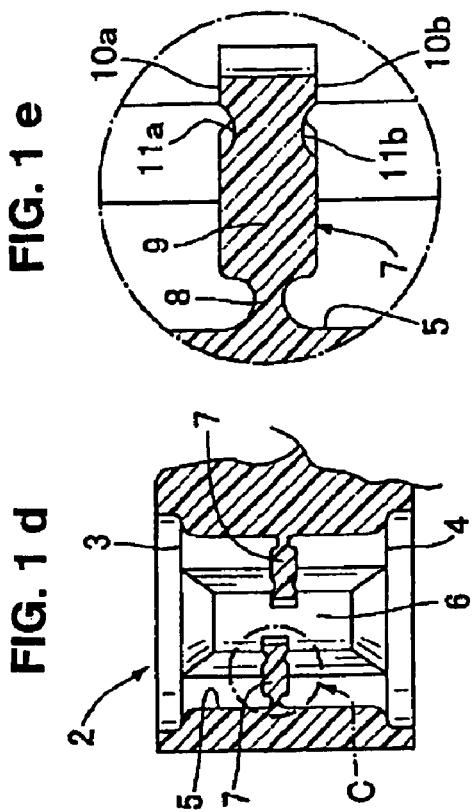
FIG. 1b is a side view of the device.

An embodiment of the invention shown in the drawings comprises a device 1 having a main body section 2 and a component mounting section 20 for attaching a component such as a pipe or dash silencer to a threaded stud 30. In the form shown, the upper and lower surfaces of the main body section 2 are nearly flat, and dish-shaped recesses 3 and 4 are formed in the upper and lower surfaces. A bore is formed in the main body section 2. The stud 30 is inserted into the bore from either end to attach the device 1 to the stud.

Figure 1C:
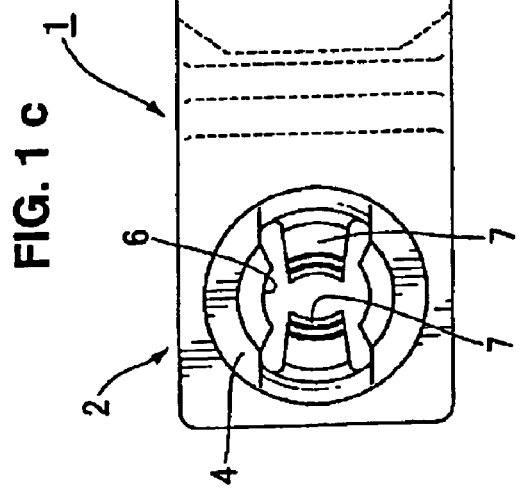
Figure 1D:
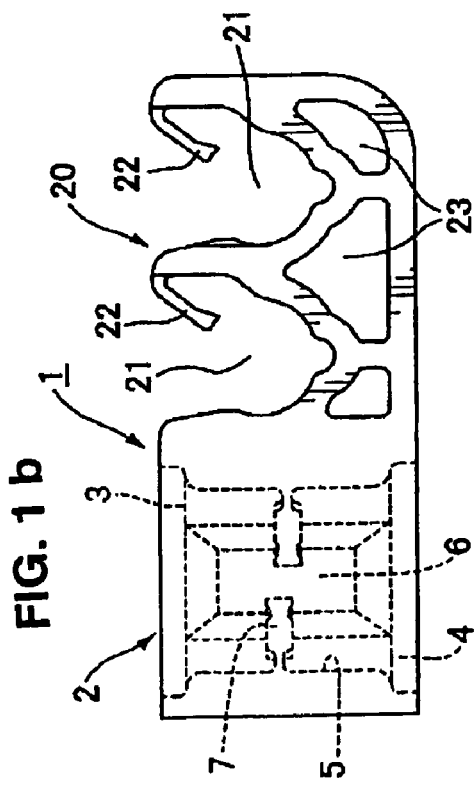

Two pawls 7 extend from opposite sides of the inner wall 5 of the bore perpendicular to the axis of the bore as shown in FIG. 1(d). The pawls 7 are staggered axially and are aligned with the pitch of the threads 31 on the stud 30.

Figure 1E:
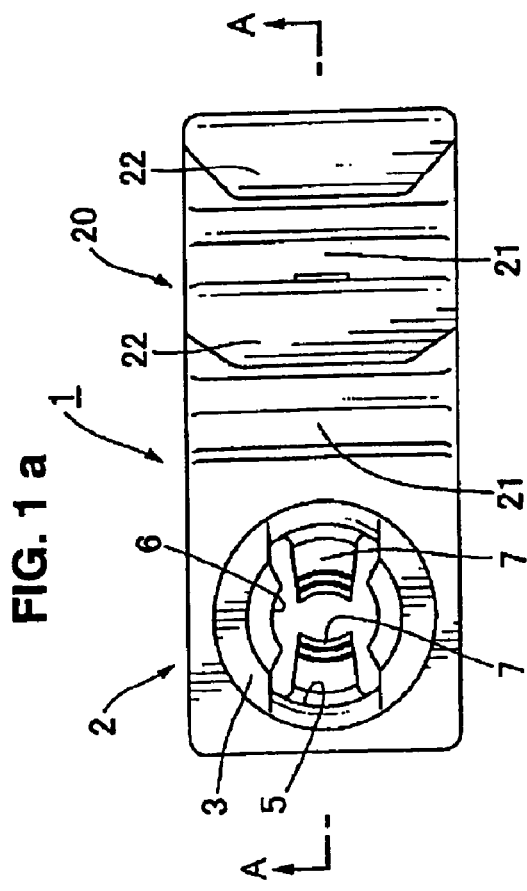
FIG. 1e is an enlarged sectional view of a portion designated in FIG. 1d by circle C.

As shown in FIG. 1(e), adjacent to the inner wall 5 of the bore the pawl 7 has a flexible thin section 8 forming a hinge that permits the pawl 7 to bend from the thin section 8 in either axial direction. The thin section 8 supports a thick section 9, which, in the form shown, is nearly flat on its side surfaces facing the ends of the bore. The thick section 9 is more rigid and more difficult to bend than the thin section 8.

Engaging sections 10a,b are formed at the end of the thick section 9 to engage threads 31 on the stud 30. Engaging section 10a is formed at one side of the pawl 7 and engaging section 10b is formed at the opposite side. As shown in FIGS. 1(a) and 1(c), the ends of the engaging sections 10a, b are arcuate so as to conform to the curvature of the threads 31.

Figure 2:
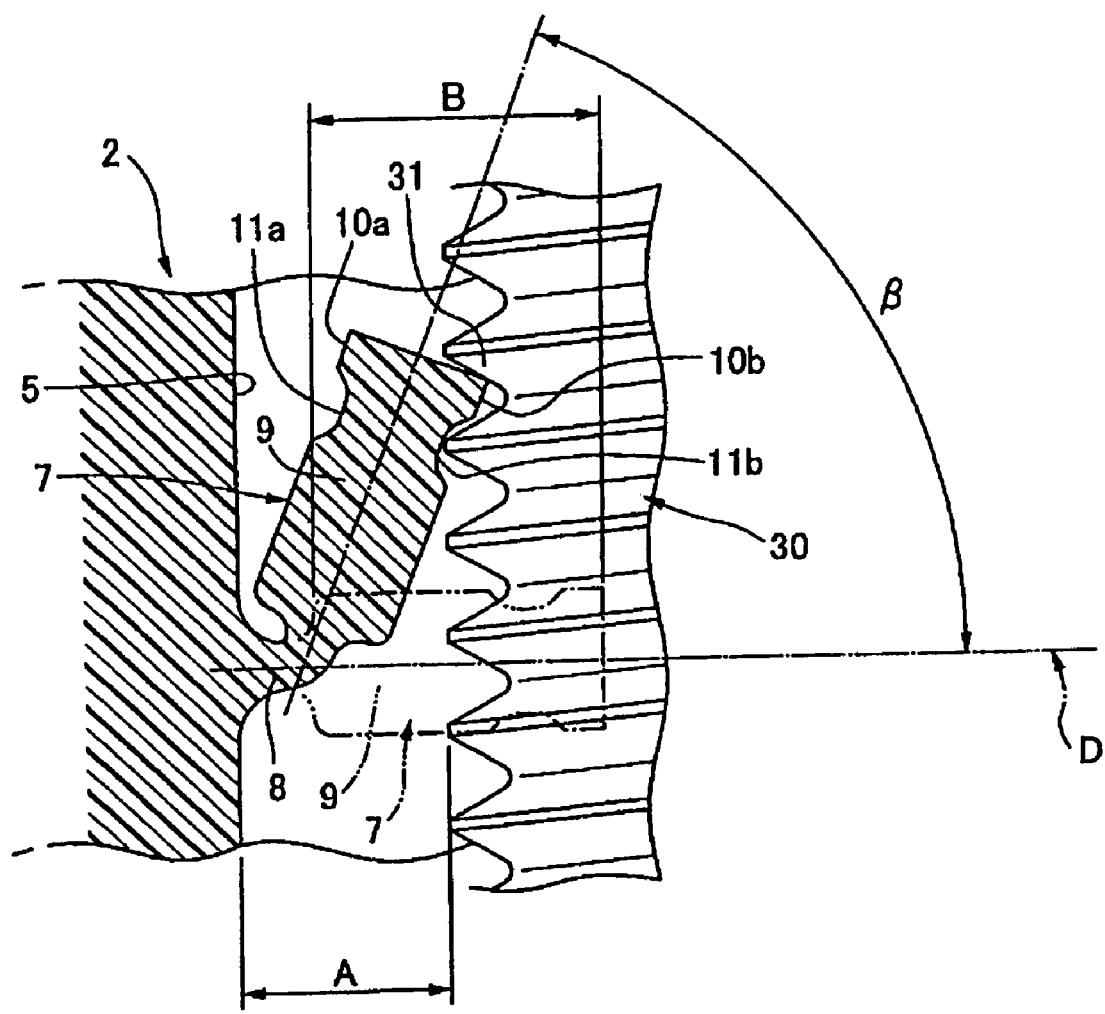
FIG. 2 is an enlarged fragmentary sectional view showing engagement of a pawl with threads of the stud.

A threading groove 11a is formed near engaging section 10a, and a threading groove 11b is formed near engaging section 10b. When an engaging section enters a space between successive crests of the threads of the stud as shown in FIG. 2, one of the crests enters one of the grooves 11a,b. The threading grooves 11a,b keep crests of the threads from coming into contact with the sides of thick section 9 and allow the engaging sections to approach the root of the threads. The threading grooves 11a,b are arcuate so as to conform to the curvature of the threads 31.

As shown in FIGS. 1a,b there are a pair of inner walls 6 of the bore at opposite sides of the pawls 7. The inner diameter of inner walls 6 is smaller than the inner diameter of inner walls 5. Inner walls 6 prevent vibrations when the stud 30 is inserted into the bore. The inner walls 5, 6 define the bore in the main body section 2.

The component mounting section 20 is used to mount a component such as a pipe. In this example, recesses 21 are formed in the component mounting section 20 to accommodate the pipes. Resilient retainers 22 formed in the component mounting section 20 hold the components on the mounting section. Hollow sections 23 may be formed below the recesses 21 to reduce the weight of the device.

FIG. 2 is an enlarged view showing a pawl when the device 1 has been mounted on a stud 30. Before device 1 is mounted on the stud 30, the centerline D of the pawl 7 extends in a direction substantially perpendicular to the axis of the bore. See the dotted lines. When the stud 30 is inserted into the bore from one end, the pawl 7 presses against threads 31 of the stud 30 and bends toward the opposite end of the bore. When the device 1 has been mounted on the stud, the centerline of the pawl 7 extends in a direction that forms an angle β substantially less than 90° with respect to the initial direction of the centerline D of the pawl 7, before mounting.

In the form shown in FIG. 2, the length of the thick section 9 of the pawl 7 is B. Also, ½ the difference between the inner diameter of the inner wall 5 and the outer diameter of the stud 30 is A. The length B of the thick section 9 of the pawl 7 is a constant substantially greater than A. When the difference between B and A is small, the device 1 tends to come off the stud 30.

Figure 3:
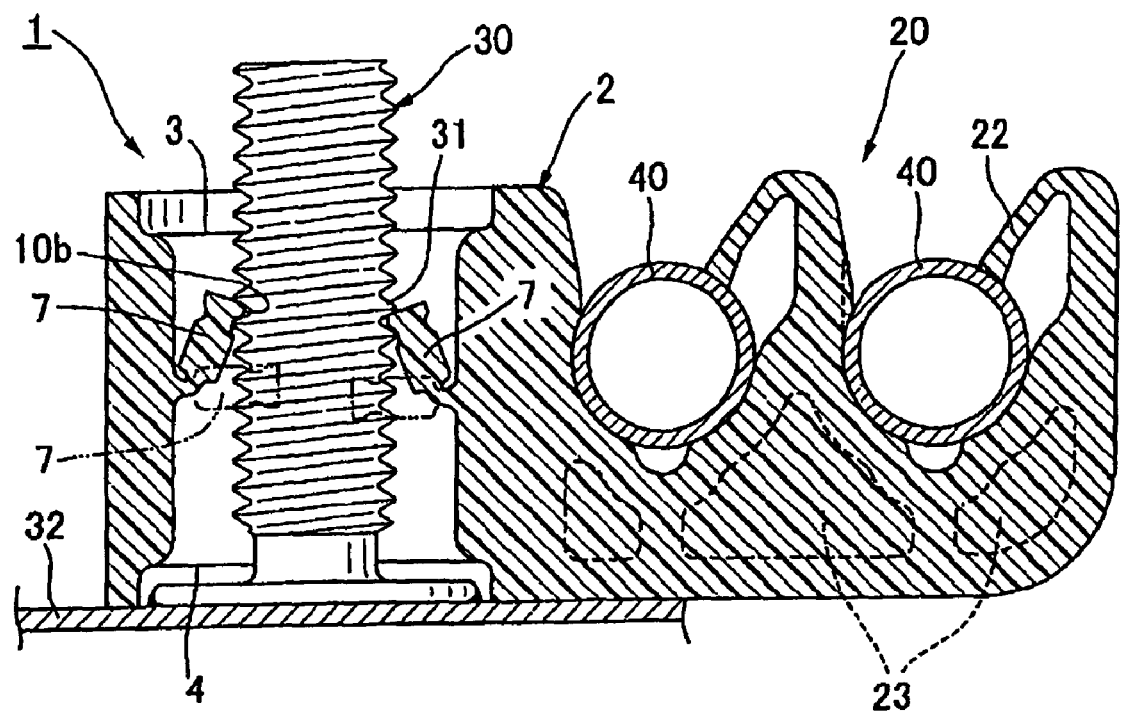
FIG. 3 is a sectional view showing the stud inserted into a bore of the device from one end.

FIG. 3 is a cross-sectional view showing the device 1 in an embodiment of the present invention mounted on a stud 30 in one direction. The position of the pawls 7 before mounting is indicated by the dotted lines, and the position of the pawls 7 after mounting is indicated by the solid lines. When the stud 30 is inserted into the bore in the device 1, the pawls 7 are bent at the thin sections and move along the threads 31 in the stud 30. At the mounting position, the engaging sections 10b on the pawls 7 and the threading grooves 11b engage the threads 31 on the stud 30, and the device 1 is secured to the stud 30.

Components 40 such as pipes can be attached to the component mounting section 20 before the device 1 is mounted on the stud 30, or after the device 1 has been mounted on the stud 30.

Figure 4:
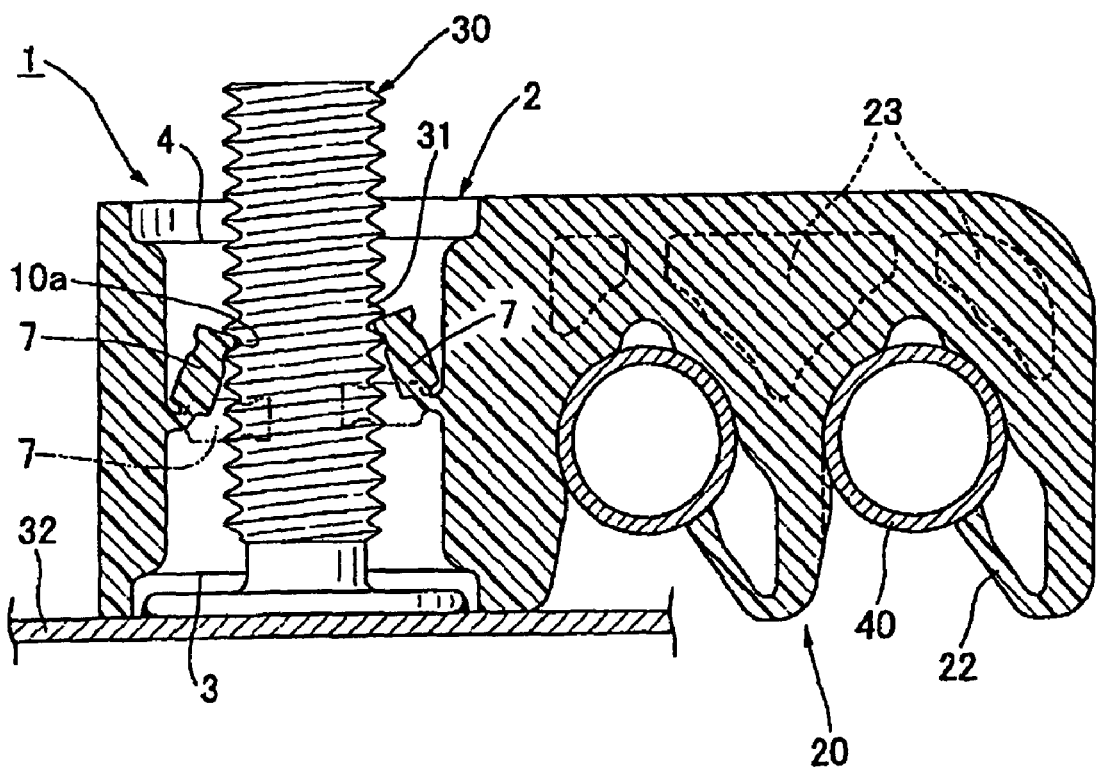
FIG. 4 is a sectional view showing a device of the invention with a stud inserted into the bore from the opposite end.

FIG. 4 is a cross-sectional view of the device 1 mounted on a stud 30 in the opposite direction. When the stud 30 is inserted into the bore in the device 1, the pawls 7 are bent at the thin sections in the direction opposite to that shown in FIG. 3 and move along the threads 31 of the stud 30. At the mounting position, the engaging sections 10a on the pawls 7 and the threading grooves 11a engage threads 31 on the stud 30, and the device 1 is secured to the stud 30.

Again, components 40 such as pipes can be attached to the component mounting section 20 before the device 1 is mounted on the stud 30, or after the device 1 has been mounted on the stud 30.

The device in this embodiment of the present invention can be mounted on a stud from either direction and has the same mounting properties in both directions. Because the threading grooves on the pawls engage threads on the stud, the engaging sections of the pawls can easily engage the threads securely. Because engaging sections and threading grooves are formed at opposite sides of the pawls, the device can be mounted on a stud from either direction. Because the thick section of the pawls is long, a highly reliable attachment to a stud is obtained using a small insertion force. Because the tips of the engaging sections of the pawls are arcuate so as to conform to curvature of the threads, they engage the threads more reliably.

This embodiment of the present invention has a pair of pawls 7. However, the number of pawls 7 is not limited to two. In this embodiment of the present invention, pipes are mounted. However, the present invention can be used to mount other components such as a dash silencer.

While a preferred embodiment of the invention has been shown and described, it will be apparent that changes can be made without departing from the principles and spirit of the invention, the scope of which is defined in the accompanying claims.

What is claimed is:

1. A combination with a threaded stud of a device for mounting a component on the threaded stud, wherein the device comprises:

a main body section with a bore for inserting a stud;

a component mounting section, and a plurality of pawls extending from an inner wall of the bore in a direction perpendicular to the axis of the bore before mounting, wherein each of the pawls has a flexible thin section connected to the inner wall of the bore and a thick section extending from the thin section, wherein a pair of engaging sections for engaging threads of the stud are formed on opposite sides of the thick section at the end of the thick section, and a pair of grooves are formed on opposite sides of the thick section adjacent to respective engaging sections for engaging threads, wherein the length (B) of the thick section of the pawls is greater than ½ the difference (A) between the inner diameter of the inner wall and the outer diameter of the stud, wherein the direction of the centerline of the pawls after mounting forms an angle $\beta$ substantially less than 90° with respect to the direction of the centerline of the pawls before mounting, and wherein the pawls can be bent in opposite directions at the thin sections for mounting on the stud from two directions.

2. A combination in accordance with claim 1, wherein a tip of each engaging section is arcuate so as to conform to the curvature of the threads.

3. A combination in accordance with claim 1, wherein the grooves are arcuate so as to conform to the curvature of the threads.

4. A combination according to claim 1, wherein tips of the engaging sections, and the grooves, are arcuate to conform to the curvature of the threads of the stud.

5. A combination according to claim 1, wherein there are a pair of the pawls at opposite sides of the bore with positions of their thin section connections to the inner wall of the bore staggered axially of the bore.

* * * * *